Patented June 12, 1951

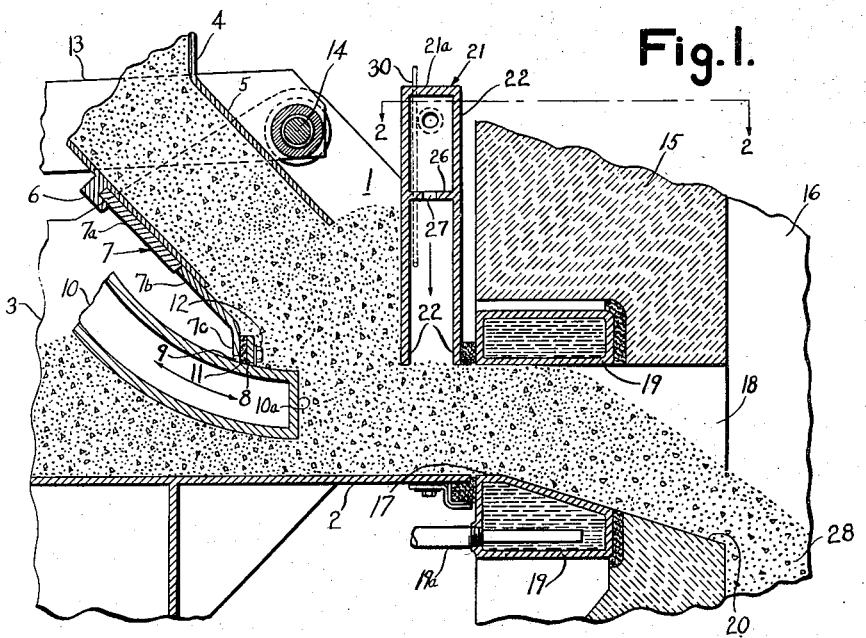
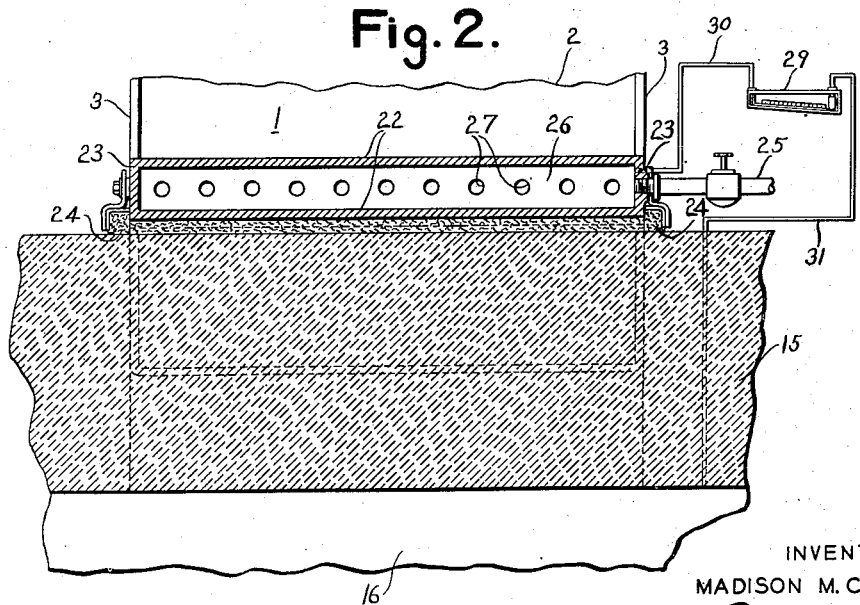

2,556,467

UNITED STATES PATENT OFFICE 2,556,467

METHOD OF CHARGING MELTING TANKS WITH GLASS BATCH AND APPARATUS THEREFOR

Madison M. Cannon, Jr., West Hartford, Conn., assignor to Emhart Manufacturing Company, a corporation of Delaware Application July 23, 1946, Serial No. 685,630

2 Claims. (Cl. 49—54)

This invention relates generally to improvements in methods of and devices for charging glass melting furnaces with glass-making materials or batch and more particularly to batch charging methods and apparatus of the type in which a continually replenished supply of batch is piled or otherwise maintained, as in a charger chamber, at a glass-making furnace of tank inlet through which inlet and from which pile the batch is gradually supplied to the tank.

One form of batch charger of the type to which the present invention relates is disclosed in the U. S. Patent application of Lorenz, Serial No. 613,095, filed August 28, 1945, now Patent No. 2,471,336. The batch charger chamber there disclosed has an outlet at its forward end from which batch may pass directly into a charging opening in a vertical wall of a melting furnace. The inlet of the batch charger chamber is at its top and well toward its forward end so that batch may be delivered by gravity through such inlet to fill the charger chamber from its forward or outlet end to the chamber inlet so that the inlet mouth of the charging opening in the wall of the tank is always filled.

In the form of batch charger referred to, an arcuately curved charging member or pusher is mounted to oscillate in the batch in the charging chamber about an axis coincident with the axis of curvature of the pusher. Movement of the pusher in the direction of the charging opening in the tank wall forces batch in the charger chamber through that opening into the tank.

The batch pusher, or comparable charging member for related types of batch chargers, customarily is driven by a motor and suitable connecting linkage or force transmitter so that a regulable force can be applied repeatedly to effect positive forward and retractive oscillatory strokes of the pusher.

It has been found that in continuous operation of an installation including batch chargers of this type, the rate of feed generally becomes slower and it was necessary to increase the stroke rate or the length of stroke of each pusher at frequent intervals in order to maintain a constant charging rate. In fact, from Monday to the following Sunday—the normal period of continuous operation—it was common practice to make readjustments two or three times during each 24 hours always in a direction to increase the stroke rate so as to maintain the desired charging rate.

While this method of readjustment served to correct and maintain the charging rate during the early part of the week, it was found that by Thursday, and sometimes even Wednesday, the charging mechanism would not be rugged enough to make a full stroke.

Numerous efforts were made to correct this condition. Air cylinders were built into the mechanism to develop greater force on the charging member. Batch charger cleaning periods were established.

The problem was further involved in that individual chargers slowed up at different rates and it was impossible to predict which charger would have the faster rate of retardation.

It was finally determined that the root of the trouble was the condensation of furnace flue gases in the batch as it lay in the batch charger. Inasmuch as the combustion chamber in the furnace normally operated under a slightly positive (above atmospheric) pressure, there was a slight flow or draft of flue gases from the tank through the charging opening into the batch charger chamber. Water being a product of combustion, the steam in the flue gas would condense in the cold batch and dampen the batch. The soda ash in the batch absorbed this moisture and reacted like cement in a mixture of concrete. The batch, and particularly that which would work itself into and collect in the space around the sides and in back of the pusher, gradually hardened with operation of the charger and obstructed the movement of the charging member.

In accordance with the present invention, this condition has been remedied by inducing a counter-draft into the batch. As is now preferred, the counter-draft was introduced into the batch adjacent the point where the batch enters the charging opening in the tank, and is introduced at a pressure sufficient to counteract the flue gas pressure in the tank. It may also be desirable to use a gaseous pressure medium which is either preheated or de-humidified or both.

Use of such a counter-draft in accordance with the present invention has completely eliminated condensation of flue gases in the batch chargers above referred to. It has done so either by preventing the infiltration of flue gas to the charger chamber or by ventilation thereof or by a combination of both.

A further advantage is that, in addition to preventing condensation of flue gases in the batch charger, the present invention prevents condensation, in the batch, of moisture from other sources, such as, for example, atmospheric air of high humidity.

Other advantages will be in part obvious and in part pointed out more in detail hereinafter.

The invention accordingly consists in the features of construction, combination of elements, arrangement of parts, and method of operation as exemplified in the construction hereinafter set forth, the scope of the invention being indicated by the appended claims.

For a more complete understanding of the novel invention, reference may be had to the following specification and the accompanying drawings disclosing one embodiment of apparatus which is adapted to the performance of the process of the invention. In the drawings:

Figure 1 is a side elevation of a batch charger including, in accordance with the invention, a manifold for creating a draft or pressure in the charger counter to that of the glass tank charged by the batch charger; and Fig. 2 is a top plan view taken along section 2—2 of Fig. 1, showing a portion of the tank and the charger including the manifold.

The improved batch charger shown in the drawings comprises a chamber 1 having a flat bottom wall 2 and a pair of straight, upstanding parallel side walls 3. The chamber may be open at its top, rear end and front end, and the latter may serve as the feed outlet of the chamber.

Batch is supplied by gravity to the charger chamber 1 from a hopper 4 through a chute 5 which slopes forwardly and downwardly from the rear to the forward portion of the chamber 1. As shown in Fig. 1, the chute 5 may be provided on its underside with a hook 6 which may be hooked over a forwardly and downwardly inclined upper portion 7a of a transverse wall 7 welded or otherwise secured at its ends to the chamber side walls 3.

A lower section of the transverse wall 7 includes a forwardly and downwardly inclined transverse portion 7b and a vertical lower portion 7c secured, as by brackets 8 to the side walls 3. As thus secured, the wall portion 7b is disposed edgewise against and forms a smooth continuation of the upper portion 7a.

The vertical lower portion 7c of the transverse wall is cut away or apertured, as at 9, Fig. 1, to afford clearance for an oscillating pusher 10. A gasket or packing strip 11 is replaceably secured on the front surface of the vertical wall portion 7c around the aperture 9, as by clamping means such as generally indicated at 12, Fig. 1, so as to project beyond the edge of the aperture 9 against the side and upper surfaces of the pusher 10. The gasket 11 may be made of brake-lining or other suitable wear-resistant material.

As illustrated in Fig. 1, the pusher 10 may comprise a body portion which is arcuately curved with its concavely curved surface uppermost. The front end wall 10a of the pusher is adapted to contact and push a substantial amount of batch out of the chamber 1 ahead of the pusher when the latter is moved from its retracted position to its forward position (Fig. 1) on its working stroke.

Oscillation of the pusher may be affected by a motor (not shown) through suitable connecting mechanism including a pair of spaced levers, one of which is indicated at 13, pivotally mounted on shaft 14 which extends transversely of the chamber 1 and is secured at its ends in the sidewalls 3.

Details of the batch charger thus far described and of suitable pusher operating mechanism therefor, are illustrated and described in the aforementioned patent application of Lorenz.

When the batch charger, as thus far described, is in its operative position relative to a vertical wall 15 of a glass-making furnace or tank, a fragmentary portion of which is indicated generally at 16, the bottom wall 2 of the charger is aligned with the horizontal threshold or sill 17 of a charging opening or passageway 18 through the tank wall 15. The outer portion of the wall 15, around the charging opening 18, may be cooled by a hollow water-cooled jacket 19 which, as illustrated in Fig. 1, may include the sill 17. Circulation of cooling water in the jacket 19 may be effected in a conventional manner, as through an inlet pipe 19a and an outlet pipe (not shown).

The lower surface 20 of the charging passageway 18, including a portion formed by the water jacket 19, slopes inwardly and downwardly from the horizontal sill 17 so as to facilitate flow of batch downwardly into the tank 16 when the batch is pushed over the sill by the pusher 10.

Glass-melting tanks, as previously indicated, are normally operated under pressure slightly in excess of atmospheric and the products of combustion therein produced contain water which, because of the high operating temperatures employed, is in the form of steam. In order to prevent the moisture-laden atmosphere in the tank from passing through the passageway 18 into the charger chamber 1, the present invention provides means for establishing in the chamber a counterpressure or draft which is slightly greater than the pressure in the tank.

Preferably the counter-pressure producing means are incorporated in the forward end of the batch charger. A preferred embodiment of the pressure producing means is illustrated in the drawing and includes a box-like manifold 21 having spaced vertical side walls 22 extending transversely of the chamber 1 and vertical end walls 23 aligned with and secured at their contiguous side and bottom edges, as by welding, to the charger side walls 3. As illustrated in Fig. 1, the manifold is closed at its top, as by the wall 21a. The manifold walls 22 and 23 extend downwardly to the level of the top of the passageway 18 and are open at their lower edges so that the manifold constitutes a forward closure for the upper portion of the charger chamber 1, and with the side walls 3 and bottom 2 of the chamber define a chamber outlet which matches the adjacent inlet of the passageway 18, and which is in open communication with the interior of the manifold.

A sealing strip or gasket 24 is secured to the charger about the outlet of the chamber in conventional manner and extends forwardly from all of the edges of the outlet. The arrangement is such that the sealing strip or gasket 24, which may be made of asbestos or other suitable, compressible, heat-resistant material, will be compressed against the wall 15 of the tank when the batch charger is moved to the tank charging position illustrated in the drawing. As there shown, the gasket 24 effectively seals the space between the tank and charger and assures a leak-proof connection of the charger outlet and the passageway 18.

With the described construction, a counter-pressure producing medium may be supplied to the manifold in regulable amount, as through the valve controlled line 25 which may be connected to a suitable source of the medium (not shown). Preferably the line 25 supplies the pressure medium such as, for example, air, to the upper part of the manifold and the medium is discharged by the manifold into the batch in the charger outlet therebeneath. For several reasons, including greater manifold strength and prevention of uneven distribution of the counter-pressure producing medium, the manifold preferably is provided with a cross-member 26 having a series of equally spaced holes 27 through which the air or similar gaseous pressure medium passes before it enters the batch. The member 26 may be spaced from the lower or open end of the manifold so that the batch can not work up to and fill the holes 27.

From the foregoing description of the embodiment of the invention shown in the drawings, the operation thereof will be readily understood. Batch may be supplied to the batch feed chamber 1 through the chute 5 from any suitable source, as the hopper 4, to fill the forward portion of the batch feed chamber to the level of the outlet of the batch supply chute 5. Batch, indicated at 28 in Fig. 1, then will continuously fill the communicating feed chamber outlet and at least the adjacent portion of the tank or furnace charging opening. Each forward stroke of the pusher 10 will cause a forward impulse on batch in the charging opening so that batch will be fed from the charging opening downwardly into the glass bath in the tank. The forward or working strokes of the batch pusher may be adjusted to obtain the desired batch feeding results.

At the same time, air or other gaseous medium is introduced into the batch by the manifold 21 at a pressure and in an amount preferably such as to establish the atmosphere within the charger outlet at a pressure slightly greater than the pressure within the tank 16. A draft gage 29 may be connected between the manifold and the tank, as by lines 30 and 31 respectively, to indicate the pressure differential therebetween. A fraction of an inch of water is sufficient for satisfactory operation and is obtained in conventional manner through regulation of the valve in the control line 25.

Inasmuch as the tank will normally be operated at a pressure slightly in excess of the atmospheric pressure outside of the tank and charger, there normally will be a greater differential between the charger outlet or counter-pressure established by the manifold and the pressure outside of the charger. Therefore the major portion of the air introduced by the manifold will flow back through the batch in the chamber 1 under a gradually lessening pressure until it equalizes with the external atmospheric pressure. Thus while the pressure in the charger outlet provides an effective seal against flow of moisture-laden atmosphere from the tank into the batch in the charger, it does not create a large flow of the counter-pressure producing medium into the tank.

The air supplied to the manifold may be dehumidified, or preheated, or both, in any suitable known way to preclude the introduction of moisture laden air into the batch in the chamber and to remove moisture introduced with the batch into the chamber. Normally, however, these precautions are not necessary, and untreated air from a conventional blower is satisfactory as a supply for the valve controlled line 25.

The counter-draft of the present invention eliminates the aforementioned detrimental moisture effect in batch chargers either by preventing the infiltrations and condensation of flue gas or by ventilation or by a combination thereof.

Where the present invention is employed, the rate of batch charging can be set on Monday and no further adjustments made throughout the week. Where multiple chargers are employed to charge a tank, the charges act the same.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. The method of charging a glass-making tank with batch which comprises feeding batch into said tank from a source of supply located outside of said tank through an opening in said tank, introducing a gas into said batch supply to create a differential in pressure between the pressure of the atmosphere within the batch being fed into the tank and the pressure of atmosphere in the batch supply exterior of the tank opening, the latter pressure being greater than said pressure within the batch being fed into the tank, said gas supplied to the batch having a lower moisture content than the atmosphere within the tank.

2. The combination with a glass melting-tank wall having a batch intake opening provided therein, a batch charger operatively associated with said wall and having a batch chamber provided with an outlet opening communicating directly with said intake opening, means to supply batch to said chamber to maintain the communicating batch intake opening and chamber outlet opening and the adjacent portion of the chamber continuously filled with batch, and means to force a gaseous fluid under a positive pressure transversely into the batch in said chamber at the outer end of said intake opening.

MADISON M. CANNON, Jr.

REFERENCES CITED

The following references are of record in the file of this patent:

UNITED STATES PATENTS

| Number | Name | Date |
| --- | --- | --- |
| 473,741 | Hansen | Apr. 26, 1892 |
| 1,500,651 | Smith | July 8, 1924 |
| 1,941,897 | Hiller | Jan. 2, 1934 |
| 1,953,427 | Moorshead | Apr. 3, 1934 |
| 1,999,761 | Howard | Apr. 30, 1935 |

FOREIGN PATENTS

| Number | Country | Date |
| --- | --- | --- |
| 486,447 | Germany | Nov. 25, 1929 |